United States Patent
Ko

(10) Patent No.: US 8,957,615 B2
(45) Date of Patent: Feb. 17, 2015

(54) MOTOR DRIVING APPARATUS

(71) Applicant: Samsung Electro-mechanics Co., Ltd., Gyunggi-do (KR)

(72) Inventor: Joo Yul Ko, Gyunggi-do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 169 days.

(21) Appl. No.: 13/660,601

(22) Filed: Oct. 25, 2012

(65) Prior Publication Data

US 2014/0035494 A1 Feb. 6, 2014

(30) Foreign Application Priority Data

Jul. 31, 2012 (KR) .................... 10-2012-0084157

(51) Int. Cl.
*H02P 23/12* (2006.01)
*H02P 6/14* (2006.01)

(52) U.S. Cl.
CPC ...................................... *H02P 6/145* (2013.01)
USPC ................. 318/400.14; 318/400.2; 318/400.3

(58) Field of Classification Search
USPC ......... 318/400.14, 400.2, 400.3, 400.04, 580, 318/811; 701/41; 180/446
See application file for complete search history.

(56) References Cited

U.S. PATENT DOCUMENTS

2006/0219471 A1 * 10/2006 Hayashi ........................ 180/446
2006/0261766 A1 11/2006 Nakagawa et al.
2011/0260669 A1 10/2011 Nakahata et al.

FOREIGN PATENT DOCUMENTS

| JP | 7-337067 A | 12/1995 |
|---|---|---|
| JP | 2004-222482 A | 8/2004 |
| JP | 2005-192338 A | 7/2005 |
| JP | 2006-325313 A | 11/2006 |
| JP | 2008-099467 A | 4/2008 |
| JP | 2009-232536 A | 10/2009 |
| JP | 2010-252480 A | 11/2010 |
| JP | 2011-229345 A | 11/2011 |

OTHER PUBLICATIONS

Office Action Japanese Patent Application No. 2012-267598 dated Dec. 17, 2013 with English translation.

* cited by examiner

*Primary Examiner* — Karen Masih
(74) *Attorney, Agent, or Firm* — McDermott Will & Emery LLP

(57) ABSTRACT

There is provided a motor driving apparatus capable of optimizing driving efficiency by adjusting a phase difference between current applied to a motor and voltage detected from the motor and performing the adjustment of the phase difference when a pulse width modulation (PWM) signal has a set duty. The motor driving apparatus includes: a driving unit driving a motor according to driving control; a driving controlling unit controlling the driving of the motor by the driving unit, based on an adjusted phase correction signal; and a phase correcting unit correcting a phase difference between a motor detection signal having motor rotation speed information and a current detection signal having detection information regarding current flowing in the motor when a duty of a pulse width modulation (PWM) signal driving the motor satisfies a preset reference duty, and providing the phase correction signal to the driving controlling unit.

14 Claims, 4 Drawing Sheets

MOTOR DRIVING APPARATUS

CROSS-REFERENCE TO RELATED APPLICATIONS

This application claims the priority of Korean Patent Application No. 10-2012-0084157 filed on Jul. 31, 2012, in the Korean Intellectual Property Office, the disclosure of which is incorporated herein by reference.

BACKGROUND OF THE INVENTION

1. Field of the Invention

The present invention relates to a motor driving apparatus capable of being optimally operated in driving a motor.

2. Description of the Related Art

A brushless direct current (BLDC) motor generally means a DC motor able to conduct a current or adjust a current direction using a non-contact position detector and a semiconductor element rather than using a mechanical contact unit such as a brush, a commutator, or the like, in a DC motor.

In order to drive the BLDC motor, a driving apparatus may be used.

FIG. 1 is a configuration diagram of a general motor driving apparatus.

Referring to FIG. 1, a general motor driving apparatus 10 may include a controlling unit 11 and a driving unit 12.

The controlling unit 11 may control driving of the motor, and the driving unit 12 may drive the motor by turning four field effect transistors (FETs) on or off according to a driving signal of the controlling unit 11.

FIG. 2 is a diagram showing driving signals of the motor driving apparatus.

Referring to FIG. 2, the driving signals transferred from the controlling unit 11 to the driving unit 12 may be divided into four types thereof and may be transferred in a sequence of identification numerals ①, ②, ③, and ④.

That is, a first PMOS FET P1 and a second NMOS FET N2 may be turned on by a driving signal represented by identification numeral ①, and the first PMOS FET P1 and the second NMOS FET N2 may be turned off while a second PMOS FET P2 and a first NMOS FET N1 may be turned on by a driving signal represented by identification numeral ②.

Again, the second PMOS FET P2 and the first NMOS FET N1 may be turned off and the first PMOS FET P1 and the second NMOS FET N2 may be turned on by a driving signal represented by identification numeral ③, and the first PMOS FET P1 and the second NMOS FET N2 may be turned off and the second PMOS FET P2 and the first NMOS FET N1 may be turned on by a driving signal represented by identification numeral ④.

In this driving scheme, when the first PMOS FET P1 and the second PMOS FET P2 are turned on, pulse width modulation (PWM) signals (oblique line portions of FIG. 2) are generated, whereby a speed of the motor may be adjusted.

This motor driving apparatus attaches importance to driving efficiency in driving the motor using a PWM signal, in like manner to the following Related Art Document. However, driving efficiency may not be optimized, due to a phase difference between current applied to the motor and voltage detected from the motor.

RELATED ART DOCUMENT (Patent Document 1) Japanese Patent Laid-open Publication No. 2008-099467

SUMMARY OF THE INVENTION

An aspect of the present invention provides a motor driving apparatus capable of optimizing driving efficiency by adjusting a phase difference between current applied to a motor and voltage detected from the motor and further performing the adjustment of the phase difference when a pulse width modulation (PWM) signal has a set duty.

According to an aspect of the present invention, there is provided a motor driving apparatus including: a driving unit driving a motor according to driving control; a driving controlling unit controlling the driving of the motor by the driving unit, based on an adjusted phase correction signal; and a phase correcting unit correcting a phase difference between a motor detection signal having motor rotation speed information and a current detection signal having detection information regarding current flowing in the motor when a duty of a pulse width modulation (PWM) signal driving the motor satisfies a preset reference duty, and providing the phase correction signal to the driving controlling unit.

The motor rotation speed information may be obtained obtained based on a hall voltage of a hall sensor adjacent to the motor or back electromotive force (BEMF) generated at the time of driving the motor.

The phase correcting unit may correct a phase difference between the motor detection signal and the current detection signal when an on-duty of the PWM signal satisfies an on-duty of 100%.

The phase correcting unit may include: a comparing unit comparing whether the duty of the PWM signal satisfies the reference duty; a phase difference detecting unit detecting a phase difference between the motor detection signal and the current detection signal according to a comparison result of the comparing unit; and a delaying unit delaying a phase of the motor detection signal according to phase information from the phase difference detecting unit.

The driving unit may include: a first pair of transistors including a first p-type metal oxide semiconductor field-effect transistor (PMOS FET) electrically connected between a power supply terminal for supplying power and a ground and a first n-type MOS FET (NMOS FET) electrically connected between the first PMOS FET and the ground; and a second pair of transistors including a second PMOS FET connected to the power supply terminal in parallel with the first PMOS FET and electrically connected between the power supply terminal and the ground and a second NMOS FET electrically connected between the second PMOS FET and the ground.

The motor driving apparatus may further include a detecting unit detecting the current flowing in the motor.

The motor driving may further include a low pass filter unit low pass filtering the detection information detected by the detecting unit.

According to an aspect of the present invention, there is provided a motor driving apparatus including: a driving unit driving a motor according to driving control; a driving controlling unit controlling the driving of the motor by the driving unit, based on an adjusted phase correction signal; and a phase correcting unit correcting a phase difference between a motor detection signal having motor position information and a current detection signal having detection information regarding current flowing in the motor when a duty of a pulse width modulation (PWM) signal driving the motor satisfies a preset reference duty, and providing the phase correction signal to the driving controlling unit.

The position information of the motor may be obtained based on a hall voltage of a hall sensor adjacent to the motor or back electromotive force (BEMF) generated at the time of driving the motor.

The phase correcting unit may correct a phase difference between the motor detection signal and the current detection signal when an on-duty of the PWM signal satisfies an on-duty of 100%.

The phase correcting unit may include: a comparing unit comparing whether the duty of the PWM signal satisfies the reference duty; a phase difference detecting unit detecting a phase difference between the motor detection signal and the current detection signal according to a comparison result of the comparing unit; and a delaying unit delaying a phase of the motor detection signal according to phase information from the phase difference detecting unit.

The driving unit may include: a first pair of transistors including a first p-type metal oxide semiconductor field-effect transistor (PMOS FET) electrically connected between a power supply terminal for supplying power and a ground and a first n-type MOS FET (NMOS FET) electrically connected between the first PMOS FET and the ground; and a second pair of transistors including a second PMOS FET connected to the power supply terminal in parallel with the first PMOS FET and electrically connected between the power supply terminal and the ground and a second NMOS FET electrically connected between the second PMOS FET and the ground.

The motor driving apparatus may further include a detecting unit detecting the current flowing in the motor.

The motor driving apparatus of may further include a low pass filter unit low pass filtering detection information detected by the detecting unit.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
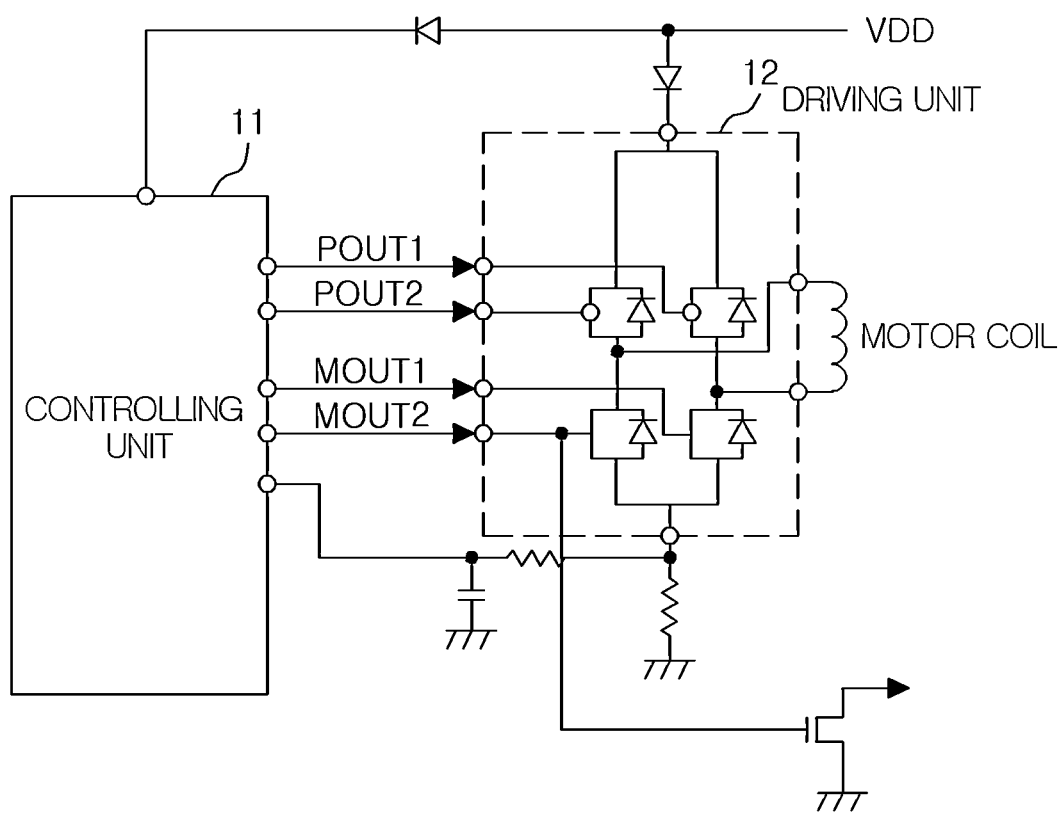
FIG. 1 is a configuration diagram of a general motor driving apparatus.
Figure 2:
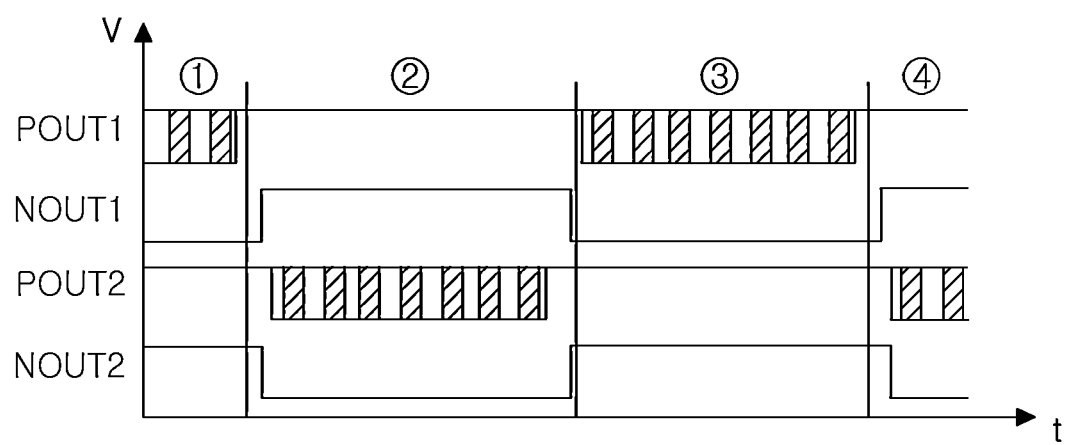
FIG. 2 is a diagram showing driving signals of the motor driving apparatus.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

Figure 3:
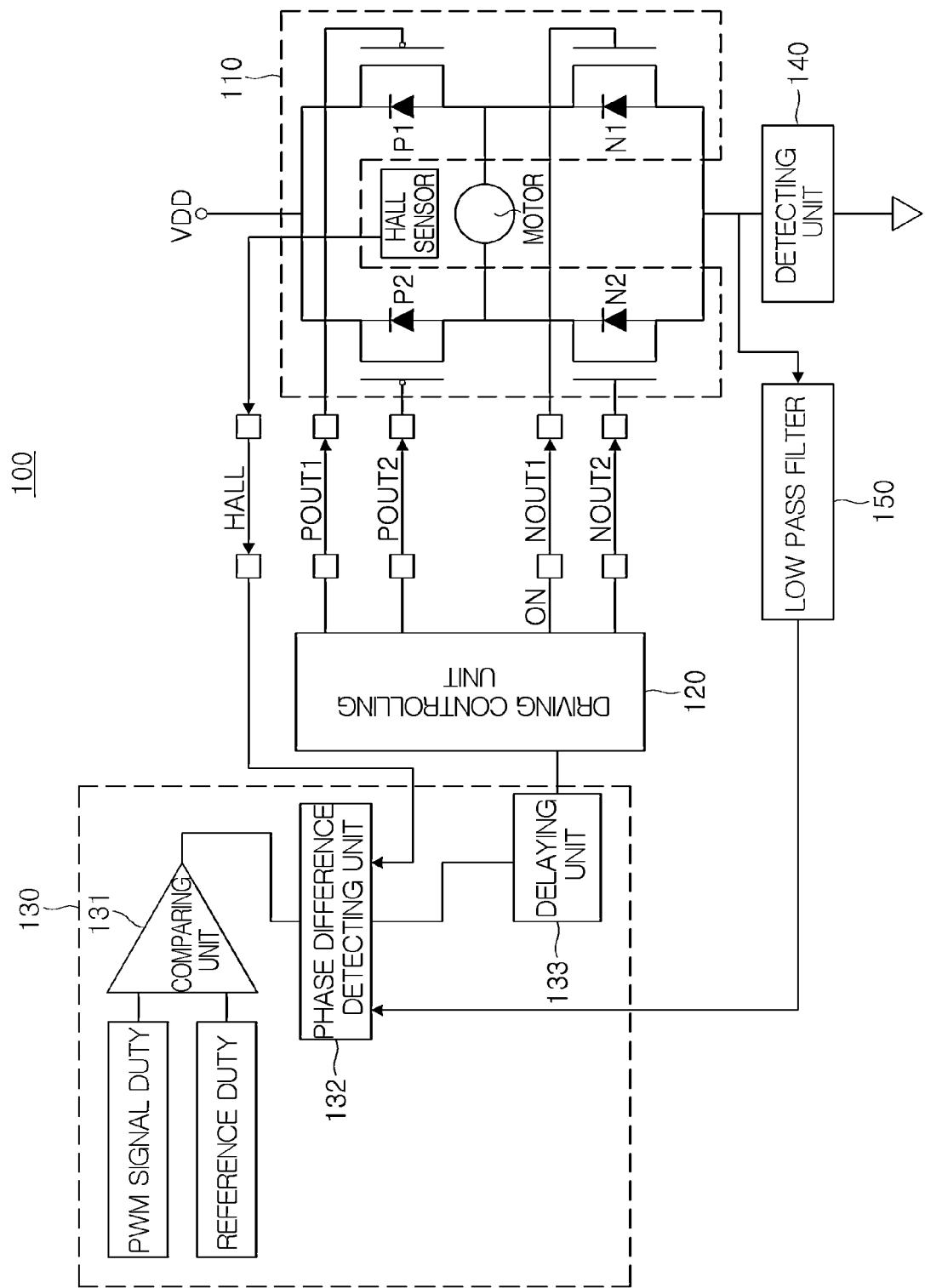
FIG. 3 is a schematic configuration diagram of a motor driving apparatus according to an embodiment of the present invention.

FIG. 3 is a schematic configuration diagram of a motor driving apparatus according to an embodiment of the present invention.

Referring to FIG. 3, a motor driving apparatus 100 according to the embodiment of the present invention may include a driving unit 110, a driving controlling unit 120, a phase correcting unit 130, a detecting unit 140, and a low pass filter unit 150.

The driving unit 110 may include a transistor switched on or off according to a control signal from the driving controlling unit 120, and a motor may be driven according to switching on or off operation of the transistor.

More specifically, the driving unit 110 may have two pairs of transistors, and each of the two pairs of transistors may include two transistors. As a result, the driving unit 110 may include a total of four transistors. The fourth transistors may be configured of two p-type metal oxide semiconductor field effect transistors (PMOS FETs) P1 and P2 and two n-type MOS FETs (NMOS FETs) N1 and N2.

The PMOS FETs P1 and P2 may include a first PMOS FET denoted by reference numeral P1 and a second PMOS FET denoted by reference numeral P2, and the NMOS FETs N1 and N2 may include a first NMOS FET denoted by reference numeral N1 and a second NMOS FET denoted by reference numeral N2. The first PMOS FET P1 may be electrically connected between a power supply terminal for supplying power VDD and a ground, and the first NMOS FET N1 may be electrically connected between the first PMOS FET P1 and the ground.

The second PMOS FET P2 may be connected to the power supply terminal in parallel with the first PMOS FET P1 and be electrically connected between the power supply terminal and the ground, and the second NMOS FET N2 may be electrically connected between the second PMOS FET P2 and the ground.

In addition, the motor is connected to a connection point between the first PMOS FET P1 and the first NMOS FET N1 and a connection point between the second PMOS FET P2 and the second NMOS FET N2, such that the motor may be driven by switching operations of the first PMOS FET P1 and the second NMSO FET N2 and switching operations of the second PMOS FET P2 and the first NMOS FET N1.

Briefly describing a motor driving operation, the first PMOS FET P1 and the second NMSO FET N2, and the second PMOS FET P2 and the first NMOS FET N1 may be alternately turned on or off by control signals POUT1, POUT2, NOUT1, and NOUT2 from the driving controlling unit 120.

That is, the first PMOS FET P1 and the second NMSO FET N2 may be turned off and the second PMOS FET P2 and the first NMOS FET N1 may be turned on by the control signals POUT1, POUT2, NOUT1, and NOUT2 from the driving controlling unit 120, and the second PMOS FET P2 and the first NMOS FET N1 may be turned off and the first PMOS FET P1 and the second NMSO FET N2 may be turned on by the control signals POUT1, POUT2, NOUT1, and NOUT2 from the driving controlling unit 120.

The driving controlling unit 120 may provide the above-mentioned control signals POUT1, POUT2, NOUT1, and NOUT2 to control the driving of the motor. Here, the driving controlling unit 120 may control a rotation speed of the motor, which may be controlled by a duty of a pulse width modulation (PWM) signal included in the control signals controlling the switching operations of the transistors. For example, when an on-duty of the PWM signal increases, the rotation speed of the motor may increase, while when the on-duty of the PWM signal decreases, the rotation speed of the motor may decrease.

However, even in the case that the on-duty of the PWM signal is a set on-duty, the rotation speed of the motor may not increase appropriately for the set on-duty. Particularly, even in the case that the on-duty of the PWM signal is an on-duty of 100%, the rotation speed of the motor may not increase appropriately for the on-duty of 100%. This may be caused by driving efficiency. Therefore, phase correction may be performed based on motor rotation speed information and detection information obtained by detecting current flowing in the motor.

The phase correcting unit 130 may correct a phase difference between a motor detection signal having motor rotation speed information or motor position information and a current detection signal having motor current detection information detected by the detecting unit 140 that may be configured of a resistor and transfer a phase correction signal to the driving controlling unit 120.

To this end, the phase correcting unit 130 may include a comparing unit 131, a phase difference detecting unit 132, and a delaying unit 133.

The comparing unit 131 may compare the duty of the PWM signal with a preset reference duty and transfer the comparison result to the phase difference detecting unit 132, and the comparison result may be a signal enabling an operation of the phase difference detecting unit 132.

That is, the comparing unit 131 may enable a phase difference detection operation of the phase difference detecting unit 132 when the on-duty of the PWM signal is an on-duty of 100% and disable the phase difference detection operation of the phase difference detecting unit 132 when the on-duty of the PWM signal is not an on-duty of 100%.

For example, the comparing unit 131 may enable the phase difference detection operation of the phase difference detecting unit 132 when the duty of the PWM signal, more specifically, the on-duty of the PWM signal, satisfies a reference duty and disable the phase difference detection operation of the phase difference detecting unit 132 when the on-duty of the PWM signal does not satisfy the reference duty.

The phase difference detecting unit 132 may detect a phase difference between the motor detection signal and the current detection signal.

The motor detection signal may include the motor rotation speed information or the motor position information. As an example, the motor detection signal may be generated based on a hall voltage from a hall sensor adjacent to the motor. As another example, the motor detection signal may be generated based on back electromotive force (BEMF) generated at the time of driving the motor.

Information regarding the phase difference detected by the phase difference detecting unit 132 (hereinafter, referred to as "phase difference information") may be transferred to the delaying unit 133.

The delaying unit 133 may include at least one delay cell and may delay a phase of the motor detection signal according to the phase difference information from the phase difference detecting unit 132.

The motor detection signal, the phase of which has been corrected may be transferred to the driving controlling unit 120 by the delaying unit 133, and the driving controlling unit 120 may control the driving of the motor based on the motor detection signal, the phase of which has been corrected.

Therefore, the motor detection signal and the current detection signal are synchronized, such that driving efficiency may be increased and the driving unit 110 may further increase the speed of the motor, even in a situation in which the on-duty of the PWM signal is 100%.

The detecting unit 140 may be connected between the driving unit 110 and the ground and may be configured of a detection resistor.

The low pass filter unit 150 may filter the detection signal from the detecting unit 140 into a preset low frequency band and transfer the filtered signal to the phase correcting unit 130.

Figure 4:
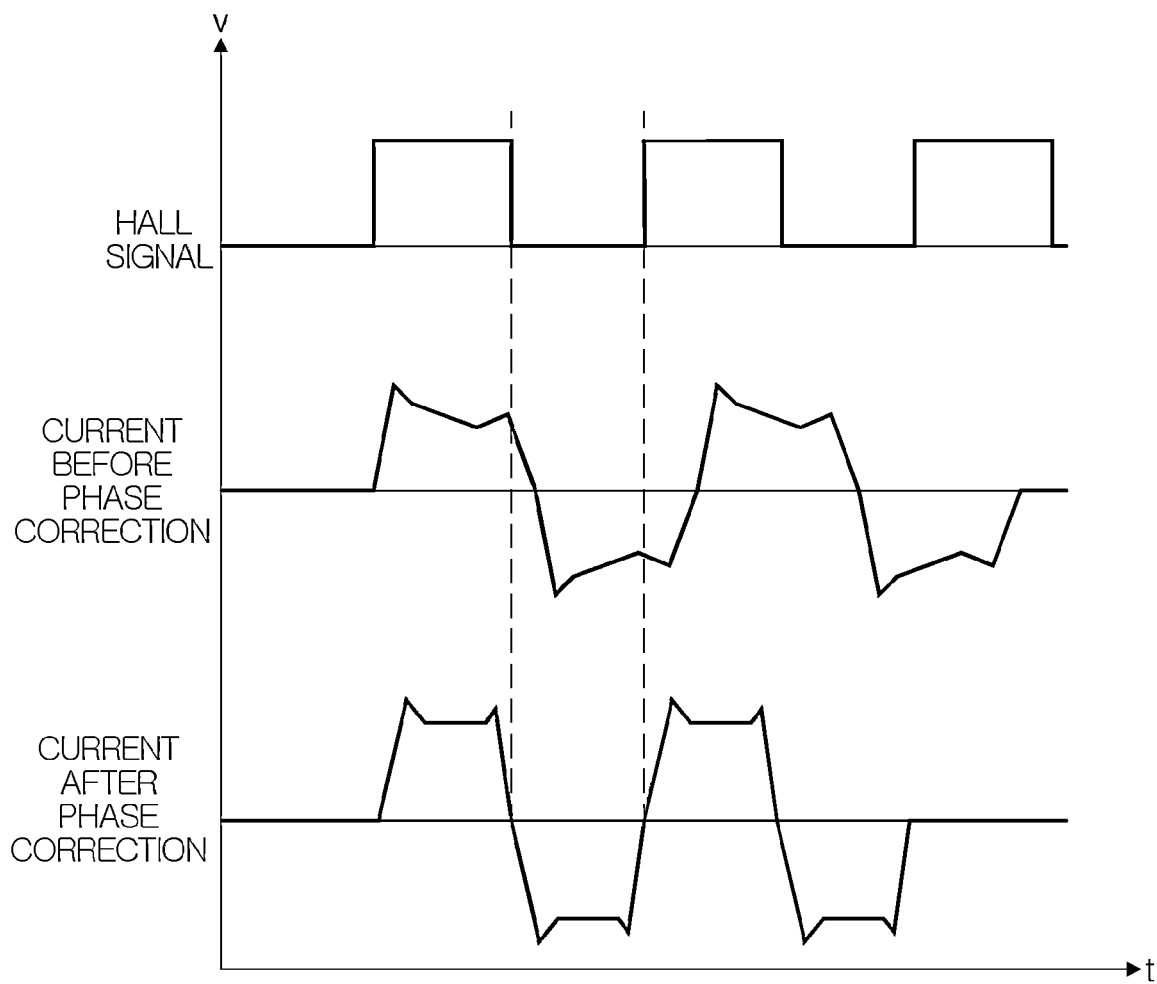
FIG. 4 is a graph showing electrical characteristics generated by the motor driving apparatus according to the embodiment of the present invention.

FIG. 4 is a graph showing electrical characteristics generated by the motor driving apparatus according to the embodiment of the present invention.

Referring to FIGS. 3 and 4, it may be appreciated that the phase of the motor detection signal is delayed by the phase correction operation of the phase correcting unit 130.

That is, as compared with the case in which the phase difference between the motor detection signal and the current detection signal is not corrected as in the related art, the motor driving apparatus according to the embodiment of the present invention corrects the phase difference between the motor detection signal and the current detection signal to synchronize the motor detection signal and the current detection signal, whereby the rotation speed of the motor may be further increased even in a situation in which the on-duty of the PWM signal is 100%.

As set forth above, according to the embodiment of the present invention, a phase difference between current applied to the motor and voltage detected from the motor is adjusted and further, the adjustment of the phase difference is performed when the duty of the PWM signal is a set duty, whereby driving efficiency can be optimized.

While the present invention has been shown and described in connection with the embodiments, it will be apparent to those skilled in the art that modifications and variations can be made without departing from the spirit and scope of the invention as defined by the appended claims.

What is claimed is:

1. A motor driving apparatus comprising:
   a driving unit driving a motor according to driving control;
   a driving controlling unit controlling the driving of the motor by the driving unit, based on an adjusted phase correction signal; and
   a phase correcting unit correcting a phase difference between a motor detection signal having motor rotation speed information and a current detection signal having detection information regarding current flowing in the motor when a duty of a pulse width modulation, PMW, signal driving the motor satisfies a preset reference duty, and providing the phase correction signal to the driving controlling unit.

2. The motor driving apparatus of claim 1, wherein the motor rotation speed information is obtained based on a hall voltage of a hall sensor adjacent to the motor or back electromotive force, BEMF, generated at the time of driving the motor.

3. The motor driving apparatus of claim 1 wherein the phase correcting unit corrects a phase difference between the motor detection signal and the current detection signal when an on-duty of the PWM signal satisfies an on-duty of 100%.

4. The motor driving apparatus of claim 1, wherein the phase correcting unit includes:
   a comparing unit comparing whether the duty of the PWM signal satisfies the reference duty;
   a phase difference detecting unit detecting a phase difference between the motor detection signal and the current detection signal according to a comparison result of the comparing unit; and
   a delaying unit delaying a phase of the motor detection signal according to phase information from the phase difference detecting unit.

5. The motor driving apparatus of claim 1, wherein the driving unit includes:

a first pair of transistors including a first p-type metal oxide semiconductor field-effect transistor, PMOS FET, electrically connected between a power supply terminal for supplying power and a ground and a first n-type MOS FET, NMOS FET, electrically connected between the first PMOS FET and the ground; and a second pair of transistors including a second PMOS FET connected to the power supply terminal in parallel with the first PMOS FET and electrically connected between the power supply terminal and the ground and a second NMOS FET electrically connected between the second PMOS FET and the ground.

6. The motor driving apparatus of claim 1, further comprising a detecting unit detecting the current flowing in the motor.

7. The motor driving apparatus of claim 6, further comprising a low pass filter unit low pass filtering detection information detected by the detecting unit.

8. A motor driving apparatus comprising:
a driving unit driving a motor according to driving control;
a driving controlling unit controlling the driving of the motor by the driving unit, based on an adjusted phase correction signal; and
a phase correcting unit correcting a phase difference between a motor detection signal having motor position information and a current detection signal having detection information regarding current flowing in the motor when a duty of a pulse width modulation, PMW, signal driving the motor satisfies a preset reference duty, and providing the phase correction signal to the driving controlling unit.

9. The motor driving apparatus of claim 8, wherein the motor position information is obtained based on a hall voltage of a hall sensor adjacent to the motor or back electromotive force, BEMF, generated at the time of driving the motor.

10. The motor driving apparatus of claim 8, wherein the phase correcting unit corrects a phase difference between the motor detection signal and the current detection signal when an on-duty of the PWM signal satisfies an on-duty of 100%.

11. The motor driving apparatus of claim 8, wherein the phase correcting unit includes:
a comparing unit comparing whether the duty of the PWM signal satisfies the reference duty;
a phase difference detecting unit detecting a phase difference between the motor detection signal and the current detection signal according to a comparison result of the comparing unit; and
a delaying unit delaying a phase of the motor detection signal according to phase information from the phase difference detecting unit.

12. The motor driving apparatus of claim 8, wherein the driving unit includes:
a first pair of transistors including a first p-type metal oxide semiconductor field-effect transistor, PMOS FET, electrically connected between a power supply terminal for supplying power and a ground and a first n-type MOS FET, NMOS FET, electrically connected between the first PMOS FET and the ground; and
a second pair of transistors including a second PMOS FET connected to the power supply terminal in parallel with the first PMOS FET and electrically connected between the power supply terminal and the ground and a second NMOS FET electrically connected between the second PMOS FET and the ground.

13. The motor driving apparatus of claim 8, further comprising a detecting unit detecting the current flowing in the motor.

14. The motor driving apparatus of claim 13, further comprising a low pass filter unit low pass filtering detection information detected by the detecting unit.

* * * * *